United States Patent
Wang

(10) Patent No.: US 10,013,941 B2
(45) Date of Patent: Jul. 3, 2018

(54) LIQUID CRYSTAL PANELS FOR REDUCING FLICKERS AND THE ARRAYS SUBSTRATES THEREOF

(71) Applicant: Shenzhen China Star Optoelectronics Technology Co., Ltd., Shenzhen, Guangdong (CN)

(72) Inventor: Jinjie Wang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 201 days.

(21) Appl. No.: 14/783,862

(22) PCT Filed: Sep. 24, 2015

(86) PCT No.: PCT/CN2015/090490
§ 371 (c)(1),
(2) Date: Oct. 10, 2015

(87) PCT Pub. No.: WO2017/041329
PCT Pub. Date: Mar. 16, 2017

(65) Prior Publication Data
US 2017/0154593 A1 Jun. 1, 2017

(30) Foreign Application Priority Data
Sep. 11, 2015 (CN) .......................... 2015 1 0580261

(51) Int. Cl.
*G09G 3/36* (2006.01)
*G09G 3/00* (2006.01)
(Continued)

(52) U.S. Cl.
CPC ......... *G09G 3/3677* (2013.01); *G02F 1/1368* (2013.01); *G02F 1/13624* (2013.01);
(Continued)

(58) Field of Classification Search
CPC ............... G09G 3/3266; G09G 3/3659; G09G 3/3674–3/3681
See application file for complete search history.

(56) References Cited

U.S. PATENT DOCUMENTS

2009/0079669 A1* 3/2009 Huang ................. G09G 3/3677
345/30
2009/0207115 A1* 8/2009 Kim ..................... G02F 1/13624
345/90

(Continued)

FOREIGN PATENT DOCUMENTS

KR 20080101582 A 11/2008

*Primary Examiner* — Sanghyuk Park
(74) *Attorney, Agent, or Firm* — Andrew C. Cheng

(57) ABSTRACT

A liquid crystal panel and the array substrate thereof are disclosed. The array substrate includes a switch controller respectively connects with the first scanning line and the second scanning line. In the 2D displaying mode, the switch controller turns on the first scanning line and the second scanning line in turn. In the 3D displaying mode, the switch controller turns on the first scanning line, and turns off the second scanning line. With such configuration, the flicker issues in the 3D displaying mode may be improved and the manufacturing cost is prevented from getting higher.

20 Claims, 3 Drawing Sheets

(51) Int. Cl.
  *G02F 1/1362* (2006.01)
  *G02F 1/1368* (2006.01)
  *H04N 13/04* (2006.01)

(52) U.S. Cl.
  CPC ....... *G02F 1/136286* (2013.01); *G09G 3/003* (2013.01); *G09G 3/3648* (2013.01); *H04N 13/0454* (2013.01); *G09G 2300/0426* (2013.01); *G09G 2300/0876* (2013.01); *G09G 2320/0247* (2013.01)

(56) References Cited

U.S. PATENT DOCUMENTS

| | | |
|---|---|---|
| 2009/0225018 A1 | 9/2009 | Kim |
| 2010/0134396 A1* | 6/2010 | Umezaki .............. G09G 3/3413 345/92 |
| 2012/0293762 A1* | 11/2012 | Shin .................... G09G 3/3677 349/139 |
| 2013/0257925 A1* | 10/2013 | Kim .................. H04N 13/0434 345/691 |
| 2014/0035968 A1 | 2/2014 | Chen |
| 2015/0103063 A1 | 4/2015 | Ye |
| 2015/0154723 A1 | 6/2015 | Wu |
| 2015/0185573 A1 | 7/2015 | Han |
| 2015/0294632 A1 | 10/2015 | Chen |
| 2015/0325182 A1 | 11/2015 | Li |
| 2016/0247468 A1 | 8/2016 | Li |

* cited by examiner

LIQUID CRYSTAL PANELS FOR REDUCING FLICKERS AND THE ARRAYS SUBSTRATES THEREOF

BACKGROUND OF THE INVENTION

1. Field of the Invention

The present disclosure relates to liquid crystal display technology, and more particularly to a liquid crystal panel and the array substrate thereof.

2. Discussion of the Related Art

In order to solve the color issues of the liquid crystal panel, a design solution of charge sharing is usually adopted. With respect to the liquid crystal devices (LCDs) of 2D and 3D, when the 3D display mode is activated, flicker may occur in the 3D displaying images if the charge sharing function of the LCD fails due to frame rotation failure.

To enhance the flicker issues, usually, the pixel charging and the pixel sharing functions are independently controlled. One output of the gate driving chip corresponds to one charge scanning line or a common scanning line. However, the number of the gate driving chip has to be doubled, which increases the manufacturing cost.

SUMMARY

The object of the invention is to provide a liquid crystal panel and the array substrate thereof to improve the flicker issues in the 3D displaying mode so as to reduce the manufacturing cost.

In one aspect, an array substrate includes: a substrate, a plurality of scanning lines, and a plurality of data lines, the scanning lines and the data lines intersecting with each other on the substrate to form a plurality of pixel cells, each of the scanning lines comprising a first scanning line and a second scanning line, when the first scanning line being turned on, the corresponding pixel cell being charged via the data line, when the second scanning line being turned on, the corresponding pixel cell sharing a voltage, wherein the array substrate comprising a switch controller respectively connecting with the first scanning line and the second scanning line, in a 2D displaying mode, the switch controller turns on the first scanning line and the second scanning line in turn, in the 3D displaying mode, the switch controller turns on the first scanning line and turns off the second scanning line; wherein a N-th pixel cell comprising a N-th main pixel cell and a N-th secondary pixel cell, the array substrate comprises a first thin-film transistor (TFT), a second TFT, a third TFT and a sharing capacitor arranged correspondingly to the N-th pixel cell, the N-th main pixel cell connects with a drain of the first TFT, a gate of the first thin-film transistor TFT connects with the first scanning line, a source of the first TFT connects with the N-th data line, the N-th secondary pixel cell connects with the drain of the second TFT, the gate of the second TFT connects with the N-th first scanning line, and the source of the second TFT connects with the N-th data line, the gate of the third TFT connects with the N-th second scanning line, the source of the third TFT connects with the N-th sub-pixel cell, and the drain of the third TFT connects with the sharing capacitor, wherein N is an integer larger than or equal to one; In the 2D displaying mode, the switch controller turns on the N-th first scanning line to turn on the first TFT and the second TFT, the N-th main pixel cell and the N-th sub-pixel cell are charged via the N-th data line, the switch controller turns on the N-th second scanning line to turn on the third TFT, and the N-th sub-pixel cell shares the voltage with the sharing capacitor; and in the 3D displaying mode, the switch controller turns on the N-th first scanning line and turns off the N-th second scanning line, the first TFT and the second TFT are turned on, and the third TFT is turned off, and the N-th main pixel cell and the N-th sub-pixel cell are charged via the N-th data line.

Wherein the switch controller comprises a plurality units, a N-th switch unit respectively connects with the N-th first scanning line and the N-th second scanning line.

In another aspect, an array substrate includes: a substrate, a plurality of scanning lines, and a plurality of data lines, the scanning lines and the data lines intersecting with each other on the substrate to form a plurality of pixel cells, each of the scanning lines comprising a first scanning line and a second scanning line, when the first scanning line being turned on, the corresponding pixel cell being charged via the data line, when the second scanning line being turned on, the corresponding pixel cell sharing a voltage, wherein the array substrate comprising a switch controller respectively connecting with the first scanning line and the second scanning line, in a 2D displaying mode, the switch controller turns on the first scanning line and the second scanning line in turn, in the 3D displaying mode, the switch controller turns on the first scanning line and turns off the second scanning line.

Wherein a N-th pixel cell comprises a N-th main pixel cell and a N-th secondary pixel cell, the array substrate comprises a first TFT, a second TFT, a third TFT and a sharing capacitor arranged correspondingly to the N-th pixel cell, the N-th main pixel cell connects with a drain of the first TFT, a gate of the first thin-film transistor TFT connects with the first scanning line, a source of the first TFT connects with the N-th data line, the N-th secondary pixel cell connects with the drain of the second TFT, the gate of the second TFT connects with the N-th first scanning line, and the source of the second TFT connects with the N-th data line, the gate of the third TFT connects with the N-th second scanning line, the source of the third TFT connects with the N-th sub-pixel cell, and the drain of the third TFT connects with the sharing capacitor, wherein N is an integer larger than or equal to one.

Wherein in the 2D displaying mode, the switch controller turns on the N-th first scanning line to turn on the first TFT and the second TFT, the N-th main pixel cell and the N-th sub-pixel cell are charged via the N-th data line, the switch controller turns on the N-th second scanning line to turn on the third TFT, and the N-th sub-pixel cell shares the voltage with the sharing capacitor.

Wherein in the 3D displaying mode, the switch controller turns on the N-th first scanning line and turns off the N-th second scanning line, the first TFT and the second TFT are turned on, and the third TFT is turned off, and the N-th main pixel cell and the N-th sub-pixel cell are charged via the N-th data line.

Wherein the switch controller comprises a plurality units, a N-th switch unit respectively connects with the N-th first scanning line and the N-th second scanning line.

Wherein the N-th switch unit comprises first transistor, a second transistor, a third transistor, and a fourth transistor, first ends of the first transistor and the fourth transistor connect receive first control signals, second ends of the first transistor and the third transistor receive the scanning driving signals, third ends of the first transistor and the second transistor connect with the N-th first scanning line, the first ends of the second transistor and the third transistor receive the second control signals, the second end of the second transistor receives the first control signals, the third ends of the third transistor and the fourth transistor connect with the N-th second scanning line, and the second end of the fourth transistor receives the second control signals.

Wherein in the 2D displaying mode, the scanning driving signals are at high level, when the first control signals are at high level and the second control signals are at low level, the first transistor and the fourth transistor are turned on, and the second transistor and the third transistor are turned off, when the N-th first scanning line is at high level and the N-th second scanning line is at low level, the first control signals are at low level, the first transistor and the fourth transistor are turned off, and the second transistor and the third transistor are turned on, the N-th first scanning line is at low level, and the N-th second scanning line is at high level.

Wherein in the 3D displaying mode, the scanning driving signals are at high level, when the first control signals are at high level and the second control signals are at low level, the first transistor and the fourth transistor are turned on, and the second transistor and the third transistor are turned off, the N-th first scanning line is at high level, and the N-th second scanning line is at low level.

Wherein the switch controller comprises a first switch controller and a second switch controller, one end of the first scanning line and one end of the second scanning line connect with the first switch controller, the other end of the first scanning line and the other end of the second scanning line connect with the second switch controller.

In another aspect, a liquid crystal panel includes: an array substrate, a color-filter substrate, and a liquid crystal layer between the array substrate and the color-filter substrate, the array substrate comprising a substrate, a plurality of scanning lines, and a plurality of data lines, the scanning lines and the data lines intersecting with each other on the substrate to form a plurality of pixel cells, each of the scanning lines comprising a first scanning line and a second scanning line, when the first scanning line being turned on, the corresponding pixel cell being charged via the data line, when the second scanning line being turned on, the corresponding pixel cell sharing a voltage, wherein the array substrate comprising a switch controller respectively connecting with the first scanning line and the second scanning line, in a 2D displaying mode, the switch controller turns on the first scanning line and the second scanning line in turn, in the 3D displaying mode, the switch controller turns on the first scanning line and turns off the second scanning line.

Wherein a N-th pixel cell comprises a N-th main pixel cell and a N-th secondary pixel cell, the array substrate comprises a first TFT, a second TFT, a third TFT and a sharing capacitor arranged correspondingly to the N-th pixel cell, the N-th main pixel cell connects with a drain of the first TFT, a gate of the first thin-film transistor TFT connects with the first scanning line, a source of the first TFT connects with the N-th data line, the N-th secondary pixel cell connects with the drain of the second TFT, the gate of the second TFT connects with the N-th first scanning line, and the source of the second TFT connects with the N-th data line, the gate of the third TFT connects with the N-th second scanning line, the source of the third TFT connects with the N-th sub-pixel cell, and the drain of the third TFT connects with the sharing capacitor, wherein N is an integer larger than or equal to one.

Wherein in the 2D displaying mode, the switch controller turns on the N-th first scanning line to turn on the first TFT and the second TFT, the N-th main pixel cell and the N-th sub-pixel cell are charged via the N-th data line, the switch controller turns on the N-th second scanning line to turn on the third TFT, and the N-th sub-pixel cell shares the voltage with the sharing capacitor.

Wherein in the 3D displaying mode, the switch controller turns on the N-th first scanning line and turns off the N-th second scanning line, the first TFT and the second TFT are turned on, and the third TFT is turned off, and the N-th main pixel cell and the N-th sub-pixel cell are charged via the N-th data line.

Wherein the switch controller comprises a plurality units, a N-th switch unit respectively connects with the N-th first scanning line and the N-th second scanning line.

Wherein the N-th switch unit comprises first transistor, a second transistor, a third transistor, and a fourth transistor, first ends of the first transistor and the fourth transistor connect receive first control signals, second ends of the first transistor and the third transistor receive the scanning driving signals, third ends of the first transistor and the second transistor connect with the N-th first scanning line, the first ends of the second transistor and the third transistor receive the second control signals, the second end of the second transistor receives the first control signals, the third ends of the third transistor and the fourth transistor connect with the N-th second scanning line, and the second end of the fourth transistor receives the second control signals.

Wherein in the 2D displaying mode, the scanning driving signals are at high level, when the first control signals are at high level and the second control signals are at low level, the first transistor and the fourth transistor are turned on, and the second transistor and the third transistor are turned off, when the N-th first scanning line is at high level and the N-th second scanning line is at low level, the first control signals are at low level, the first transistor and the fourth transistor are turned off, and the second transistor and the third transistor are turned on, the N-th first scanning line is at low level, and the N-th second scanning line is at high level.

Wherein in the 3D displaying mode, the scanning driving signals are at high level, when the first control signals are at high level and the second control signals are at low level, the first transistor and the fourth transistor are turned on, and the second transistor and the third transistor are turned off, the N-th first scanning line is at high level, and the N-th second scanning line is at low level.

Wherein the switch controller comprises a first switch controller and a second switch controller, one end of the first scanning line and one end of the second scanning line connect with the first switch controller, the other end of the first scanning line and the other end of the second scanning line connect with the second switch controller.

In view of the above, when the first scanning line is turned on, the corresponding pixel cell is charged via the data line. When the second scanning line is turned on, the corresponding pixel cells share the voltage. The array substrate further includes a switch controller respectively connects with the first scanning line and the second scanning line. In the 2D displaying mode, the switch controller turns on the first scanning line and the second scanning line in turn. In the 3D displaying mode, the switch controller turns on the first scanning line and turns off the second scanning line. As the first scanning line is turned on and the second scanning line is turned off during the 3D displaying mode, only the charging function is executed. In this way, the flicker issue may be improved in the 3D displaying mode so as to reduce the manufacturing cost.

DETAILED DESCRIPTION OF THE EMBODIMENTS

Embodiments of the invention will now be described more fully hereinafter with reference to the accompanying drawings, in which embodiments of the invention are shown.

Figure 1:
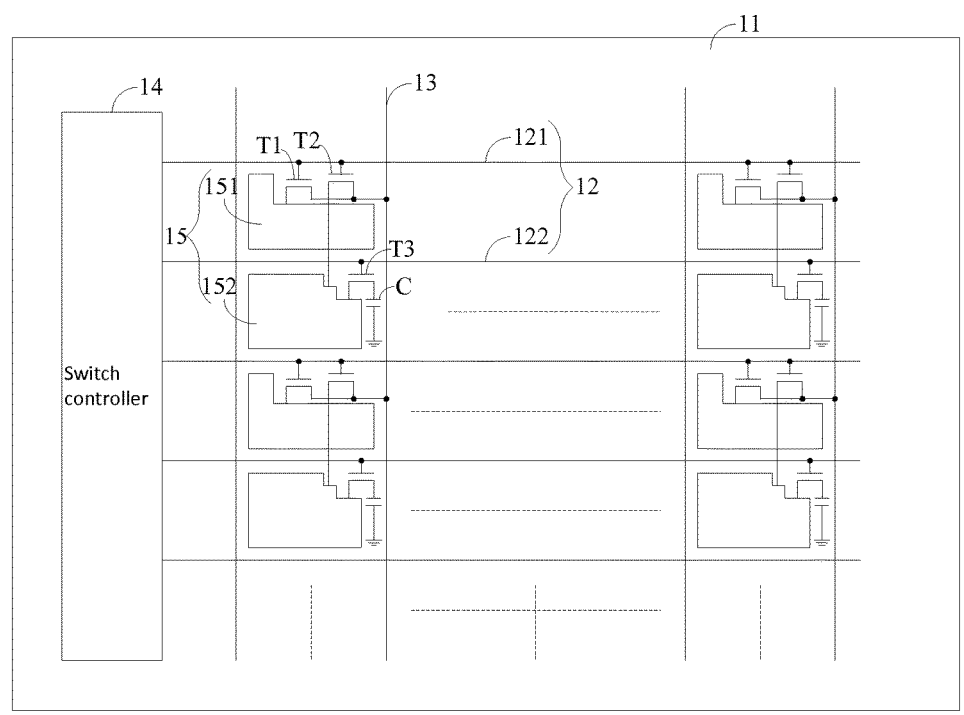
FIG. 1 is a schematic view of the array substrate in accordance with a first embodiment.

FIG. 1 is a schematic view of the array substrate in accordance with a first embodiment. The array substrate 10 includes a 2D (two-dimension) displaying mode and a 3D (three-dimension) displaying mode. As shown in FIG. 1, the array substrate 10 includes a substrate 11, a plurality of scanning lines 12, a plurality of data lines 13, and a switch controller 14.

The scanning lines 12 and the data lines 13 are configured to intersect with each other on the substrate so as to form a plurality of pixel cells 15. Each of the scanning lines 12 includes a first scanning line 121 and a second scanning line 122. When the first scanning line 121 is turned on, the corresponding pixel cell 15 is charged. When the second scanning line 122 is turned on, the corresponding pixel cell 15 shares the voltage. That is, the pixel cell 15 connected with the second scanning line 122 shares the voltage.

The switch controller 14 respectively connects with the first scanning line 121 and the second scanning line 122. In the 2D displaying mode, the switch controller 14 turns on the first scanning line 121 and the second scanning line 122 in turn to implement the charging and the voltage sharing function. In the 3D displaying mode, the switch controller 14 turns on the first scanning line 121 and turns off the second scanning line 122. Thus, only the charging function is implemented, which improves the flicker issue in the 3D displaying mode so as to decrease the manufacturing cost.

The N-th pixel cell will be taken as one example hereinafter, wherein the N-th pixel cell 15 includes an N-th main pixel cell 151 and an N-th sub-pixel cell 152, and N is an integer larger than or equal to one.

The array substrate 10 further includes a first thin-film transistor TFT (T1), a second TFT (T2), a third TFT (T3) and a sharing capacitor (C) arranged correspondingly to the N-th pixel cell.

The N-th main pixel cell 151 connects with the drain of the first thin-film transistor (T1), the gate of the first thin-film transistor (T1) connects with the first scanning line 121, and the source of the first thin-film transistor (T1) connects with the N-th data line 13. The N-th sub-pixel cell 152 connects with the drain of the second TFT (T2), the gate of the second TFT (T2) connects with the N-th first scanning line, and the source of the second TFT (T2) connects with the N-th data line 13. The gate of the third TFT (T3) connects with the N-th second scanning line 122, the source of the third TFT (T3) connects with the N-th sub-pixel cell 152, and the drain of the third TFT (T3) connects with the sharing capacitor (C). That is, the drain of the third TFT (T3) is grounded via the sharing capacitor (C).

The outputs of the switch controller 14 respectively connect to the N-th first scanning line 121 and the N-th second scanning line 122. The input end of the switch controller 14 connects with the scanning driving signals.

In the 2D displaying mode, the switch controller 14 turns on the N-th first scanning line 121. That is, the N-th first scanning line 121 receives the high level scanning driving signals, and the first thin-film transistor (T1) and the second TFT (T2) are turned on at the same time. The N-th main pixel cell 151 and the N-th sub-pixel cell 152 connect with the N-th data line 13. The N-th main pixel cell 151 and the N-th sub-pixel cell 152 are charged via the N-th data line 13 so as to implement the charging function. After the N-th main pixel cell 151 and the N-th sub-pixel cell 152 are charged completely, the switch controller 14 turns on the N-th second scanning line 122. That is, the second scanning line 122 receives the high level scanning driving signals and the third TFT (T3) is turned on. The N-th sub-pixel cell 152 connects with the sharing capacitor (C). The N-th sub-pixel cell 152 shares the voltage with the sharing capacitor (C) such that the voltage of the N-th sub-pixel cell 152 is smaller than the voltage of the N-th main pixel cell 151. In this way, the voltage sharing is achieved so as to improve the color shift issue when the viewing angle is large.

In the 3D displaying mode, the switch controller 14 turns on the N-th first scanning line 121 and turns off the N-th second scanning line 122. That is, the N-th first scanning line 121 receives the high level scanning driving signals, and the N-th second scanning line 122 receives the low level scanning driving signals. The first thin-film transistor (T1) and the second TFT (T2) are turned on at the same time, and the third TFT (T3) is turned off. The N-th main pixel cell 151 and the N-th sub-pixel cell 152 connect with the N-th data line 13, and are charged by the N-th data line 13 so as to implement the charging function. In this way, the flicker issue in the 3D displaying mode may be improved without increasing the gate driving chip, and thus the manufacturing cost is prevented from getting higher.

Figure 2:
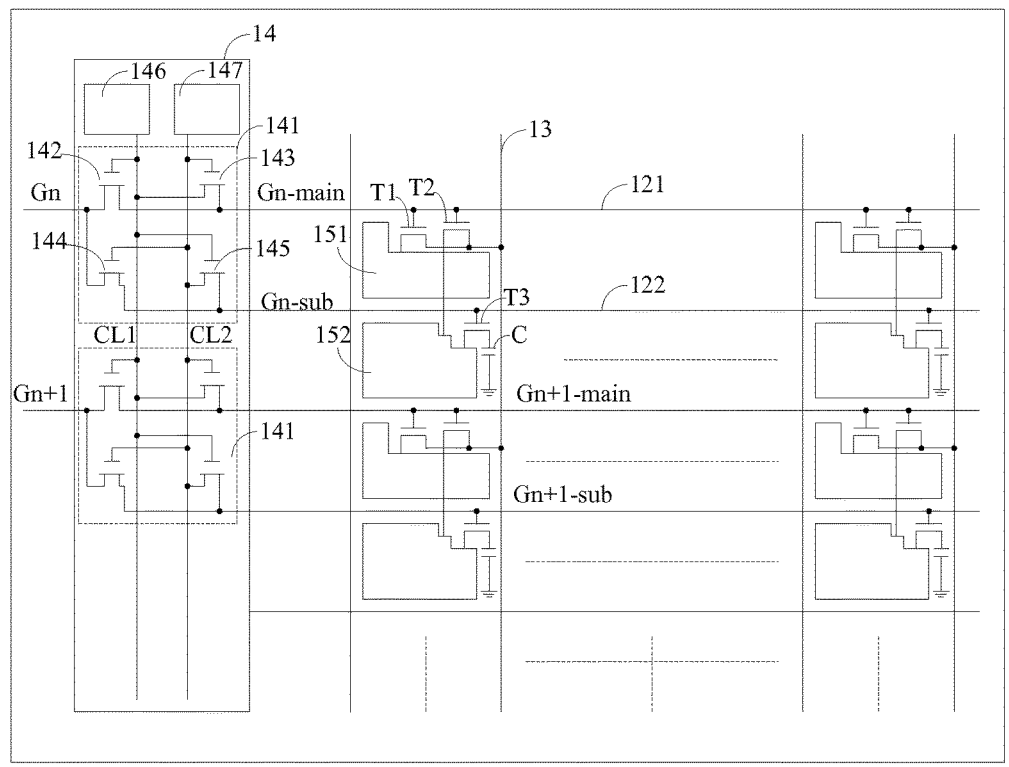
FIG. 2 is a schematic view of the array substrate in accordance with a second embodiment.

The second embodiment will be described on the basis of the first embodiment. As shown in FIG. 2, the switch controller 14 of the array substrate includes a plurality of switch units 141. The N-th switch unit 141 respectively connects with the N-th first scanning line 121 and the N-th second scanning line 122.

In the embodiment, the N-th switch unit 141 includes a first transistor 142, a second transistor 143, a third transistor 144, and a fourth transistor 145. The switch controller 14 further includes a first control signals generation unit 146 and a second control signals. First ends of the first transistor 142 and the fourth transistor 145 connect with the first control signals generation unit 146 to receive first control signals (CL1). Second ends of the first transistor 142 and the third transistor 144 receive the scanning driving signals (Gn). Third ends of the first transistor 142 and the second transistor 143 connect with the N-th first scanning line 121. The first ends of the second transistor 143 and the third transistor 144 connect with the second control signals generation unit 147 to receive the second control signals (CL2). The second end of the second transistor 143 connects with the first control signals generation unit 146 to receive the first control signals (CL1). The third ends of the third transistor 144 and the fourth transistor 145 connect with the N-th second scanning line 122. The second end of the fourth transistor 145 connects with the second control signals generation unit 147 to receive the second control signals (CL2).

Preferably, the first transistor 142, the second transistor 143, the third transistor 144, and the fourth transistor 145 are thin-film transistors. The first end is the gate, the second end is the source, and the third end is the drain. The signals of the N-th first scanning line are the Gn-main, and the signals of the N-th second scanning line are the Gn-sub.

As shown in Table 1, in the 2D displaying mode, when at time T1, the scanning driving signals (Gn) are at high level. The first control signals generation unit 146 generates the first control signals (CL1) at high level, and the second control signals generation unit 147 generates the second control signals (CL2) at low level. The first transistor 142 and the fourth transistor 145 are turned on, and the second transistor 143 and the third transistor 144 are turned off. The signals (Gn-main) of the N-th first scanning line 121 are at high level. The signals (Gn-sub) of the N-th second scanning line 122 are at low level. The first thin-film transistor (T1) and the second TFT (T2) are turned on at the same time. The N-th main pixel cell 151 and the N-th sub-pixel cell 152 connect with the N-th data line 13. The N-th main pixel cell 151 and the N-th sub-pixel cell 152 are charged via the N-th data line 13 so as to implement the charging function.

At the time T2, the scanning driving signals (Gn) are at high level. The first control signals (CL1) generated by the first control signals generation unit 146 are at low level, and the second control signals (CL2) generated by the second control signals generation unit 147 are at high level. The first transistor 142 and the fourth transistor 145 are turned off, and the second transistor 143 and the third transistor 144 are turned on. The signals (Gn-main) of the N-th first scanning line 121 are at low level, and the signals (Gn-sub) of the N-th second scanning line 122 are at high level. The third TFT (T3) is turned on, and the N-th sub-pixel cell 152 connects with the sharing capacitor (C). The N-th sub-pixel cell 152 shares the voltage with the sharing capacitor (C) such that the voltage of the N-th sub-pixel cell 152 is smaller than the voltage of the N-th main pixel cell 151. In this way, the voltage sharing may be achieved so as to eliminate the color shift when the viewing angle is large.

TABLE 1

Timing table of the array substrate in the 2D displaying mode, wherein H relates to high level and L relates to low level.

|    | CL1 | CL2 | Gn | Gn + 1 | Gn-main | Gn-sub | Gn + 1-main | Gn + 1-sub |
|----|-----|-----|----|--------|---------|--------|-------------|------------|
| T1 | H   | L   | H  | L      | H       | L      | L           | L          |
| T2 | L   | H   | H  | L      | L       | H      | L           | L          |
| T3 | H   | L   | L  | H      | L       | L      | H           | L          |
| T4 | L   | H   | L  | H      | L       | L      | L           | H          |

As shown in Table 2, in the 3D displaying mode, when at time T1, the scanning driving signals (Gn) are at high level. The first control signals (CL1) generated by the first control signals generation unit 146 are at high level, and the second control signals (CL2) generated by the second control signals generation unit 147 are at low level. The first transistor 142 and the fourth transistor 145 are turned on, and the second transistor 143 and the third transistor 144 are turned off. The signals (Gn-main) of the N-th first scanning line 121 are at high level, and the signals (Gn-sub) of the N-th second scanning line 122 are at low level. The first thin-film transistor (T1) and the second TFT (T2) are turned on at the same time. The N-th main pixel cell 151 and the N-th sub-pixel cell 152 connect with the N-th data line 13. The N-th main pixel cell 151 and the N-th sub-pixel cell 152 connect with the N-th data line 13 to charge so as to implement the charging function.

At time T2, the scanning driving signals (Gn) are at high level. The first control signals (CL1) generated by the first control signals generation unit 146 are at high level, and the second control signals (CL2) of the second control signals generation unit 147 are at low level. The first transistor 142 and the fourth transistor 145 are turned on, and the second transistor 143 and the third transistor 144 are turned off. The signals (Gn-main) of the N-th first scanning line 121 are at high level, and the signals (Gn-sub) of the N-th second scanning line 122 are at low level. The first thin-film transistor (T1) and the second TFT (T2) are turned on at the same time. The N-th main pixel cell 151 and the N-th sub-pixel cell 152 connect with the N-th data line 13. The N-th main pixel cell 151 and the N-th sub-pixel cell 152 are charged via the N-th data line 13. Thus, the flicker issue in the 3D displaying mode may be improved without adding the gate driving chip, which reduces the manufacturing cost.

TABLE 2

Timing table of the array substrate in the 3D displaying mode, wherein H relates to high level and L relates to low level.

|    | CL1 | CL2 | Gn | Gn + 1 | Gn-main | Gn-sub | Gn + 1-main | Gn + 1-sub |
|----|-----|-----|----|--------|---------|--------|-------------|------------|
| T1 | H   | L   | H  | L      | H       | L      | L           | L          |
| T2 | H   | L   | H  | L      | H       | L      | L           | L          |
| T3 | H   | L   | L  | H      | L       | L      | H           | L          |
| T4 | H   | L   | L  | H      | L       | L      | H           | L          |

Figure 3:
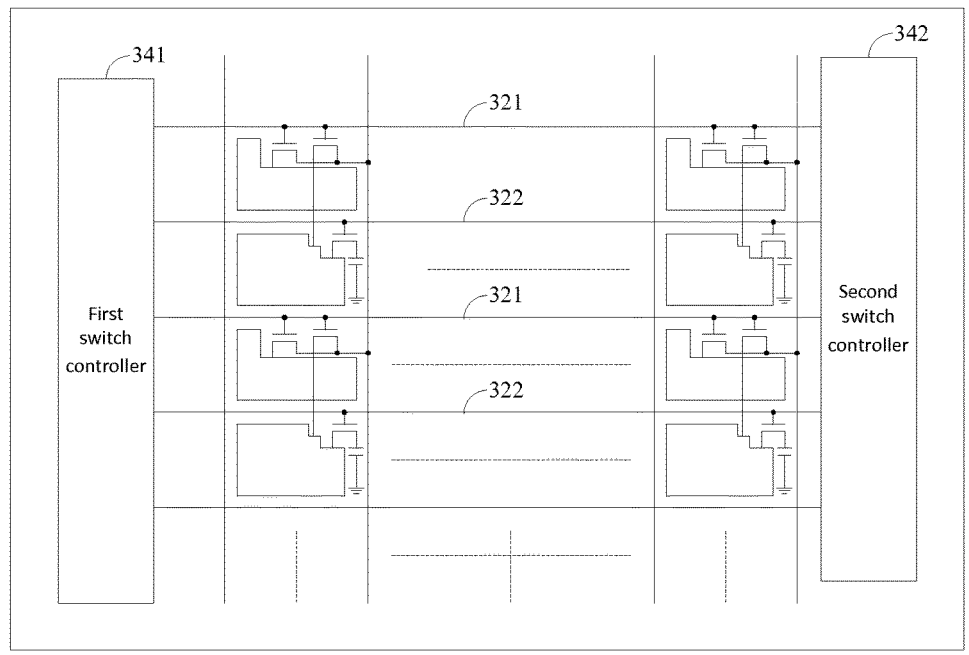
FIG. 3 is a schematic view of the array substrate in accordance with a third embodiment.

The third embodiment will be described on the basis of the second embodiment. As shown in FIG. 3, the switch controller of the array substrate includes a first switch controller 341 and a second switch controller 342. One end of the N-th first scanning line 321 and one end of the N-th second scanning line 322 connect with the first switch controller 341. The other end of the N-th first scanning line 321 and the other end of the N-th second scanning line 322 connect with the second switch controller 342. The first switch controller 341 and the second switch controller 342 are the switch controller 14 in the above embodiments.

Figure 4:
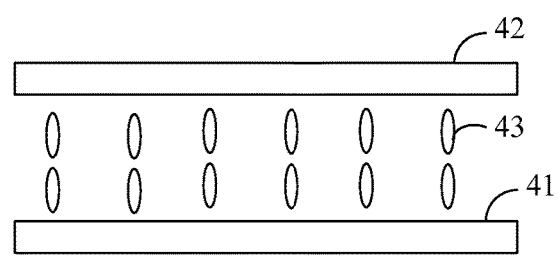
FIG. 4 is a schematic view of the liquid crystal panel in accordance with the first embodiment.

In one embodiment, a liquid crystal panel will be described on the basis of the array substrate 10 of the first embodiment. As shown in FIG. 4, the liquid crystal panel 40 includes an array substrate 41, a color-filter substrate 42, and a liquid crystal layer 43 between the array substrate 41 and the color-filter substrate 42. The array substrate 41 is opposite to the color-filter substrate 42. The array substrate 41 is the above array substrate 10.

In view of the above, when the first scanning line is turned on, the corresponding pixel cell is charged via the data line. When the second scanning line is turned on, the corresponding pixel cells share the voltage. The array substrate further includes a switch controller respectively connects with the first scanning line and the second scanning line. In the 2D displaying mode, the switch controller turns on the first scanning line and the second scanning line in turn. In the 3D displaying mode, the switch controller turns on the first scanning line and turns off the second scanning line. As the first scanning line is turned on and the second scanning line is turned off during the 3D displaying mode, only the charging function is executed. In this way, the flicker issue may be improved in the 3D displaying mode so as to reduce the manufacturing cost.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:
1. An array substrate, comprising:
   a substrate, a plurality of scanning lines, and a plurality of data lines, the scanning lines and the data lines inter- secting with each other on the substrate to form a plurality of pixel cells, each of the scanning lines comprising a first scanning line and a second scanning line, when the first scanning line being turned on, the corresponding pixel cell being charged via the data line, when the second scanning line being turned on, the corresponding pixel cell sharing a voltage, wherein the array substrate comprising a switch controller respectively connecting with the first scanning line and the second scanning line, in a 2D displaying mode, the switch controller turns on the first scanning line and the second scanning line in turn, in the 3D displaying mode, the switch controller turns on the first scanning line and turns off the second scanning line;

wherein a N-th pixel cell comprising a N-th main pixel cell and a N-th secondary pixel cell, the array substrate comprises a first thin-film transistor (TFT), a second TFT, a third TFT and a sharing capacitor arranged correspondingly to the N-th pixel cell, the N-th main pixel cell connects with a drain of the first TFT, a gate of the first thin-film transistor TFT connects with the first scanning line, a source of the first TFT connects with the N-th data line, the N-th secondary pixel cell connects with the drain of the second TFT, the gate of the second TFT connects with the N-th first scanning line, and the source of the second TFT connects with the N-th data line, the gate of the third TFT connects with the N-th second scanning line, the source of the third TFT connects with the N-th sub-pixel cell, and the drain of the third TFT connects with the sharing capacitor, wherein N is an integer larger than or equal to one;

in the 2D displaying mode, the switch controller turns on the N-th first scanning line to turn on the first TFT and the second TFT, the N-th main pixel cell and the N-th sub-pixel cell are charged via the N-th data line, after the N-th main pixel cell and the N-th sub-pixel cell being charged completely, the switch controller turns on the N-th second scanning line to turn on the third TFT, and the N-th sub-pixel cell shares the voltage with the sharing capacitor; and in the 3D displaying mode, the switch controller turns on the N-th first scanning line and turns off the N-th second scanning line, the first TFT and the second TFT are turned on, and the third TFT is turned off, and the N-th main pixel cell and the N-th sub-pixel cell are charged via the N-th data line.

2. The array substrate claimed in claim 1, wherein the switch controller comprises a plurality units, a N-th switch unit respectively connects with the N-th first scanning line and the N-th second scanning line.

3. An array substrate, comprising:
a substrate, a plurality of scanning lines, and a plurality of data lines, the scanning lines and the data lines intersecting with each other on the substrate to form a plurality of pixel cells, each of the scanning lines comprising a first scanning line and a second scanning line, when the first scanning line being turned on, the corresponding pixel cell being charged via the data line, when the second scanning line being turned on, the corresponding pixel cell sharing a voltage, wherein the array substrate comprising a switch controller respectively connecting with the first scanning line and the second scanning line, in a 2D displaying mode, the switch controller turns on the first scanning line to charge a N-th main pixel cell and the N-th sub-pixel cell, and after the N-th main pixel cell and the N-th sub-pixel cell being charged completely, the switch controller turns on the second scanning line, in the 3D displaying mode, the switch controller turns on the first scanning line and turns off the second scanning line.

4. The array substrate claimed in claim 3, wherein a N-th pixel cell comprises the N-th main pixel cell and the N-th secondary pixel cell, the array substrate comprises a first TFT, a second TFT, a third TFT and a sharing capacitor arranged correspondingly to the N-th pixel cell, the N-th main pixel cell connects with a drain of the first TFT, a gate of the first thin-film transistor TFT connects with the first scanning line, a source of the first TFT connects with the N-th data line, the N-th secondary pixel cell connects with the drain of the second TFT, the gate of the second TFT connects with the N-th first scanning line, and the source of the second TFT connects with the N-th data line, the gate of the third TFT connects with the N-th second scanning line, the source of the third TFT connects with the N-th sub-pixel cell, and the drain of the third TFT connects with the sharing capacitor, wherein N is an integer larger than or equal to one.

5. The array substrate claimed in claim 4, wherein in the 3D displaying mode, the switch controller turns on the N-th first scanning line and turns off the N-th second scanning line, the first TFT and the second TFT are turned on, and the third TFT is turned off, and the N-th main pixel cell and the N-th sub-pixel cell are charged via the N-th data line.

6. The array substrate claimed in claim 5, wherein in the 2D displaying mode, the switch controller turns on the N-th first scanning line to turn on the first TFT and the second TFT, the N-th main pixel cell and the N-th sub-pixel cell are charged via the N-th data line, the switch controller turns on the N-th second scanning line to turn on the third TFT, and the N-th sub-pixel cell shares the voltage with the sharing capacitor.

7. The array substrate claimed in claim 4, wherein the switch controller comprises a plurality units, a N-th switch unit respectively connects with the N-th first scanning line and the N-th second scanning line.

8. The array substrate claimed in claim 7, wherein the N-th switch unit comprises first transistor, a second transistor, a third transistor, and a fourth transistor, first ends of the first transistor and the fourth transistor connect receive first control signals, second ends of the first transistor and the third transistor receive the scanning driving signals, third ends of the first transistor and the second transistor connect with the N-th first scanning line, the first ends of the second transistor and the third transistor receive the second control signals, the second end of the second transistor receives the first control signals, the third ends of the third transistor and the fourth transistor connect with the N-th second scanning line, and the second end of the fourth transistor receives the second control signals.

9. The array substrate claimed in claim 8, wherein in the 2D displaying mode, the scanning driving signals are at high level, when the first control signals are at high level and the second control signals are at low level, the first transistor and the fourth transistor are turned on, and the second transistor and the third transistor are turned off, when the N-th first scanning line is at high level and the N-th second scanning line is at low level, the first control signals are at low level, the first transistor and the fourth transistor are turned off, and the second transistor and the third transistor are turned on, the N-th first scanning line is at low level, and the N-th second scanning line is at high level.

10. The array substrate claimed in claim 8, wherein in the 3D displaying mode, the scanning driving signals are at high level, when the first control signals are at high level and the second control signals are at low level, the first transistor and the fourth transistor are turned on, and the second transistor and the third transistor are turned off, the N-th first scanning line is at high level, and the N-th second scanning line is at low level.

11. The array substrate claimed in claim 3, wherein the switch controller comprises a first switch controller and a second switch controller, one end of the first scanning line and one end of the second scanning line connect with the first switch controller, the other end of the first scanning line and the other end of the second scanning line connect with the second switch controller.

12. A liquid crystal panel, comprising:
an array substrate, a color-filter substrate, and a liquid crystal layer between the array substrate and the color-filter substrate, the array substrate comprising a substrate, a plurality of scanning lines, and a plurality of data lines, the scanning lines and the data lines intersecting with each other on the substrate to form a plurality of pixel cells, each of the scanning lines comprising a first scanning line and a second scanning line, when the first scanning line being turned on, the corresponding pixel cell being charged via the data line, when the second scanning line being turned on, the corresponding pixel cell sharing a voltage, wherein the array substrate comprising a switch controller respectively connecting with the first scanning line and the second scanning line, in a 2D displaying mode, the switch controller turns on the first scanning line to charge a N-th main pixel cell and the N-th sub-pixel cell, and after the N-th main pixel cell and the N-th sub-pixel cell being charged completely, the switch controller turns on the second scanning line, in the 3D displaying mode, the switch controller turns on the first scanning line and turns off the second scanning line.

13. The liquid crystal panel claimed in claim 12, wherein a N-th pixel cell comprises the N-th main pixel cell and the N-th secondary pixel cell, the array substrate comprises a first TFT, a second TFT, a third TFT and a sharing capacitor arranged correspondingly to the N-th pixel cell, the N-th main pixel cell connects with a drain of the first TFT, a gate of the first thin-film transistor TFT connects with the first scanning line, a source of the first TFT connects with the N-th data line, the N-th secondary pixel cell connects with the drain of the second TFT, the gate of the second TFT connects with the N-th first scanning line, and the source of the second TFT connects with the N-th data line, the gate of the third TFT connects with the N-th second scanning line, the source of the third TFT connects with the N-th sub-pixel cell, and the drain of the third TFT connects with the sharing capacitor, wherein N is an integer larger than or equal to one.

14. The liquid crystal panel claimed in claim 13, wherein in the 2D displaying mode, the switch controller turns on the N-th first scanning line to turn on the first TFT and the second TFT, the N-th main pixel cell and the N-th sub-pixel cell are charged via the N-th data line, the switch controller turns on the N-th second scanning line to turn on the third TFT, and the N-th sub-pixel cell shares the voltage with the sharing capacitor.

15. The liquid crystal panel claimed in claim 13, wherein in the 3D displaying mode, the switch controller turns on the N-th first scanning line and turns off the N-th second scanning line, the first TFT and the second TFT are turned on, and the third TFT is turned off, and the N-th main pixel cell and the N-th sub-pixel cell are charged via the N-th data line.

16. The liquid crystal panel claimed in claim 13, wherein the switch controller comprises a plurality units, a N-th switch unit respectively connects with the N-th first scanning line and the N-th second scanning line.

17. The liquid crystal panel claimed in claim 16, wherein the N-th switch unit comprises first transistor, a second transistor, a third transistor, and a fourth transistor, first ends of the first transistor and the fourth transistor connect receive first control signals, second ends of the first transistor and the third transistor receive the scanning driving signals, third ends of the first transistor and the second transistor connect with the N-th first scanning line, the first ends of the second transistor and the third transistor receive the second control signals, the second end of the second transistor receives the first control signals, the third ends of the third transistor and the fourth transistor connect with the N-th second scanning line, and the second end of the fourth transistor receives the second control signals.

18. The liquid crystal panel claimed in claim 17, wherein in the 2D displaying mode, the scanning driving signals are at high level, when the first control signals are at high level and the second control signals are at low level, the first transistor and the fourth transistor are turned on, and the second transistor and the third transistor are turned off, when the N-th first scanning line is at high level and the N-th second scanning line is at low level, the first control signals are at low level, the first transistor and the fourth transistor are turned off, and the second transistor and the third transistor are turned on, the N-th first scanning line is at low level, and the N-th second scanning line is at high level.

19. The liquid crystal panel claimed in claim 17, wherein in the 3D displaying mode, the scanning driving signals are at high level, when the first control signals are at high level and the second control signals are at low level, the first transistor and the fourth transistor are turned on, and the second transistor and the third transistor are turned off, the N-th first scanning line is at high level, and the N-th second scanning line is at low level.

20. The liquid crystal panel claimed in claim 12, wherein the switch controller comprises a first switch controller and a second switch controller, one end of the first scanning line and one end of the second scanning line connect with the first switch controller, the other end of the first scanning line and the other end of the second scanning line connect with the second switch controller.

* * * * *